Jan. 4, 1944.

C. F. SUMMY 2,338,215

GEARLESS DIFFERENTIAL

Filed April 11, 1942

Charles F. Summy INVENTOR.

BY
Victor J. Evans & Co.

ATTORNEYS

Patented Jan. 4, 1944

2,338,215

UNITED STATES PATENT OFFICE 2,338,215

GEARLESS DIFFERENTIAL

Charles F. Summy, Sutter, Calif.

Application April 11, 1942, Serial No. 438,609

2 Claims. (Cl. 74—389.5)

This invention relates to a gearless differential and has for an object to provide a self-acting differential comprising a ring gear and overrunning clutches on the wheel axles connected to the ring gear, the arrangement being such that the vehicle may be driven in forward and in reverse speeds and around curves in the usual manner, and in addition equal distribution of power to the axles will always be automatically available, thus making it possible where one wheel is mired, for the other wheel to exert the necessary traction to move the vehicle.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
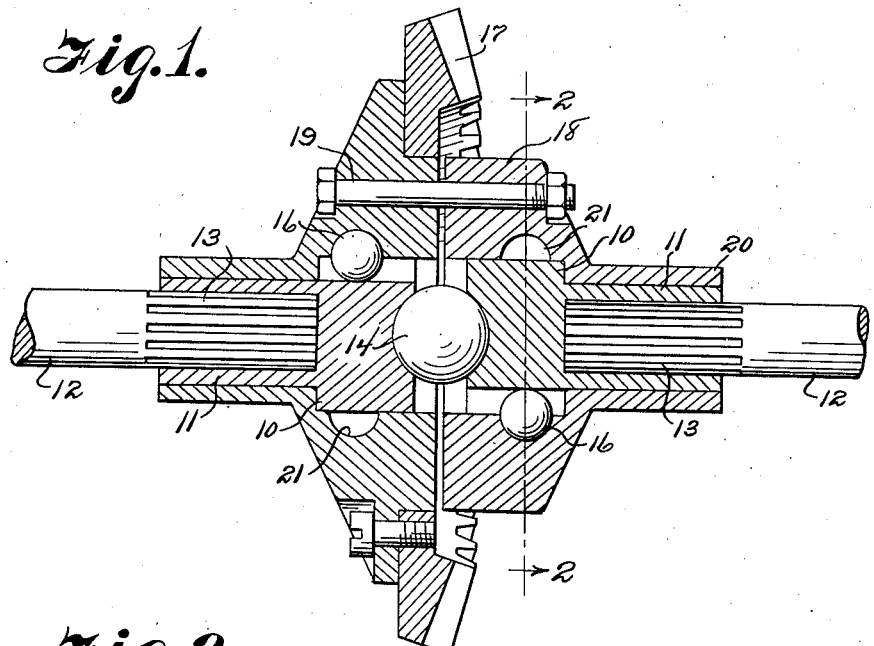
Figure 1 is a view, partly in section and partly in elevation, of a gearless differential constructed in accordance with the invention.

Referring now to the drawing in which like characters of reference designate similar parts in the various views, the gearless differential comprises cylindrical hubs 10 having respective sleeves 11 in which the inner ends of the wheel axles 12 are splined as shown at 13. The two hubs are recessed on their confronting faces to receive a ball 14 which separates the hubs and acts as a thrust bearing for both axles.

Figure 2:
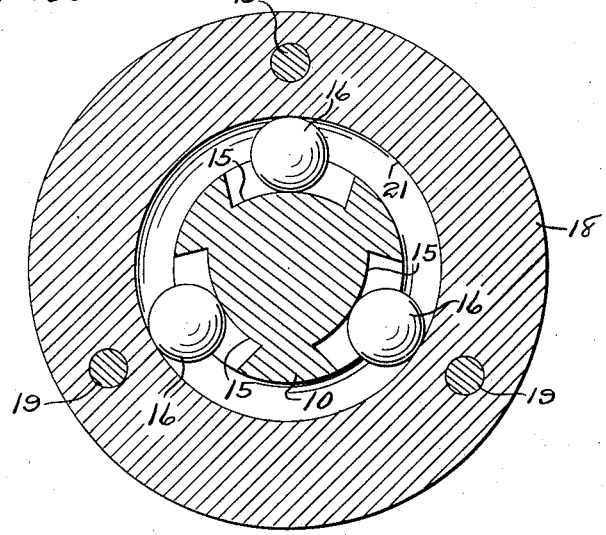
Figure 2 is a cross sectional view taken on the line 2—2 of Figure 1.

The periphery of each hub is provided with spaced grooves 15, see Figure 2, the grooves being relatively deep at their central portions and shallow at their ends. Respective balls 16 are disposed in the grooves.

A ring gear 17, which is driven by the usual pinion on the propeller shaft of the vehicle, is secured to a two part housing comprising cylindrical hubs 18 bolted together as shown at 19 and provided with respective sleeves 20 which receive the sleeves 11 of the axle hubs 10.

Each hub 18 of the differential housing is provided with a respective annular groove 21 on the inner periphery, this groove receiving the balls 16 carried in the grooves 15 of the hubs of the axles so that the balls cannot become displaced. The annular grooves 21 are of such size that they are engaged by the balls 16 when the balls approach either end of the grooves 16 so that the axles will be driven forwardly or backwardly according to the direction of rotation of the ring gear. Thus power will be distributed to both axles so that where one wheel is mired, the other wheel may exert the necessary traction to move the vehicle.

When the vehicle is driven around curves the outer wheel runs free and in making a curve the ring gear 17 is relatively turning as fast as the free running wheel axle, and traveling in the same direction, and this prevents the balls 16 from locking, although this would not be the case were the ring gear stationary and power was applied to start it. When the free running outer wheel is making a curve the balls 16 of that wheel will ride to the deep portions of the slots of the grooves 15 to permit the vehicle being driven around a turn in the conventional manner, but the balls cannot lock for the reason hitherto described.

From the above description it is thought that the construction and operation of the invention will be fully understood without further explanation.

What is claimed is:

1. In a differential mechanism, a pair of transversely divided housing sections, means uniting the said sections to form a housing assembly, an external ring gear fixed to one of the said sections, the interior chamber of each section having an annular groove, a bearing sleeve extending axially from each bearing section, a pair of circular complementary hubs rotatably fitted in the housing sections, an axle engaging sleeve of reduced external diameter projecting axially from each hub and rotatably mounted in each section sleeve, each of the said hubs having a plurality of arcuate circumferential grooves in its exterior periphery disposed at circumferentially spaced intervals, and a clutch ball mounted in each arcuate groove and corresponding annular groove to provide over-running connection between the housing sections and the hubs.

2. In a differential mechanism, a pair of transversely divided housing sections united to provide a housing assembly, an external ring gear fixed to the said assembly, each of the said housing sections having a cylindrical interior chamber provided with an annular groove of approximately semi-circular cross section, a bearing sleeve extending axially outward from each housing section, a pair of cylindrical complementary hubs rotatably fitted in the respective chambers of the housing sections, a tubular sleeve of reduced external diameter projecting axially from each hub and journaled in the sleeves of the housing sections, each of the said hubs having a plurality of circumferentially spaced arcuate grooves in the exterior thereof, the said arcuate grooves being of varying depth circumferentially of each hub with the center portion being of greater depth than the end portions, a clutch ball mounted in each arcuate groove and projecting into the corresponding annular housing groove of the respective hubs to provide over-running clutch connection between the housing sections and the hubs, and drive axles splined to the hub sleeves.

CHARLES F. SUMMY.